United States Patent
Reid

(10) Patent No.: US 11,300,669 B2
(45) Date of Patent: Apr. 12, 2022

(54) ASPECTS OF SONAR SYSTEMS OR OTHER ACOUSTIC IMAGING SYSTEMS

(71) Applicant: SEZANNE MARINE LIMITED, Oban (GB)

(72) Inventor: Ceri Reid, West Linton (GB)

(73) Assignee: SEZANNE MARINE LIMITED, Argyll (GB)

( * ) Notice: Subject to any disclaimer, the term of this patent is extended or adjusted under 35 U.S.C. 154(b) by 698 days.

(21) Appl. No.: 15/537,159

(22) PCT Filed: Dec. 17, 2015

(86) PCT No.: PCT/GB2015/054062
§ 371 (c)(1),
(2) Date: Jun. 16, 2017

(87) PCT Pub. No.: WO2016/097747
PCT Pub. Date: Jun. 23, 2016

(65) Prior Publication Data
US 2017/0363724 A1     Dec. 21, 2017

Related U.S. Application Data

(60) Provisional application No. 62/092,975, filed on Dec. 17, 2014.

(30) Foreign Application Priority Data

Dec. 18, 2014 (GB) ..................... 1422690

(51) Int. Cl.
*G01S 7/521* (2006.01)
*G01S 7/526* (2006.01)
(Continued)

(52) U.S. Cl.
CPC ............ *G01S 7/526* (2013.01); *B06B 1/0688* (2013.01); *G01S 7/521* (2013.01); *G01S 7/52003* (2013.01);
(Continued)

(58) Field of Classification Search
CPC .......... G01S 7/526; G01S 15/10; G01S 15/89; G01S 7/52; G01S 7/521; G01S 7/52003; G01S 15/32; B06B 1/0688
See application file for complete search history.

(56) References Cited

U.S. PATENT DOCUMENTS

| 4,821,038 A * | 4/1989 | Enge .................. G01S 1/24 342/389 |
| 5,197,037 A | 3/1993 | Leavitt |

(Continued)

FOREIGN PATENT DOCUMENTS

| EP | 0 036 348 A1 | 9/1981 |
| EP | 0 087 184 A1 | 8/1983 |

(Continued)

OTHER PUBLICATIONS

Analog-to-digital converter (Year: 2019).*
(Continued)

*Primary Examiner* — Isam A Alsomiri
*Assistant Examiner* — Amie M Ndure
(74) *Attorney, Agent, or Firm* — Marshall, Gerstein & Borun LLP

(57) ABSTRACT

A sonar transmit array (11), comprising: a plurality of transmitters configured to generate an acoustic sonar signal, wherein at least one of the transmitters is a polyvinylidene difluoride, PVDF, piezoelectric device configured to generate at least part of the acoustic sonar signal. Some embodiments, include a receive array (12) and the associated receive array circuitry (14).

7 Claims, 5 Drawing Sheets

(51) Int. Cl.
*B06B 1/06* (2006.01)
*G01S 15/89* (2006.01)
*G01S 15/10* (2006.01)
*G01S 7/52* (2006.01)
*G01S 15/32* (2006.01)

(52) U.S. Cl.
CPC .............. *G01S 15/10* (2013.01); *G01S 15/32* (2013.01); *G01S 15/89* (2013.01)

(56) References Cited

U.S. PATENT DOCUMENTS

| | | | |
|---|---|---|---|
| 5,230,340 | A | 7/1993 | Rhyne |
| 5,437,281 | A | 8/1995 | Lin et al. |
| 5,675,554 | A | 10/1997 | Cole et al. |
| 5,793,701 | A | 8/1998 | Wright et al. |
| 6,356,555 | B1* | 3/2002 | Rakib ................ H03M 13/256 370/441 |
| 6,438,071 | B1 | 8/2002 | Hansen et al. |
| 6,532,192 | B1 | 3/2003 | Reid |
| 8,295,326 | B1 | 10/2012 | Reid |
| 9,405,001 | B2* | 8/2016 | Stewart ................ G01S 13/10 |
| 10,209,353 | B2* | 2/2019 | Thomas, Jr. ........ G01S 13/0209 |
| 10,732,272 | B2* | 8/2020 | Kishigami ............ G01S 13/288 |
| 2003/0222778 | A1* | 12/2003 | Piesinger ............. G01S 13/878 340/541 |
| 2003/0223310 | A1 | 12/2003 | Benjamin et al. |
| 2005/0007882 | A1* | 1/2005 | Bachelor ................ G01S 15/89 367/103 |
| 2005/0099887 | A1* | 5/2005 | Zimmerman ........ G01S 7/52003 367/12 |
| 2008/0114248 | A1* | 5/2008 | Urbano ................ A61B 8/4438 600/447 |
| 2008/0114249 | A1 | 5/2008 | Randall et al. |
| 2009/0240152 | A1 | 9/2009 | Angelsen et al. |
| 2010/0259433 | A1* | 10/2010 | Bishop .................. H04B 7/086 341/155 |
| 2012/0272738 | A1* | 11/2012 | Klessel ............... G01S 7/52028 73/602 |
| 2013/0234803 | A1* | 9/2013 | Hansen ................. H04L 27/20 332/144 |
| 2013/0258805 | A1* | 10/2013 | Hansen ................... A61B 8/14 367/8 |
| 2015/0293209 | A1* | 10/2015 | Fairley .................. G01S 7/288 342/21 |
| 2015/0326463 | A1* | 11/2015 | Solondz ................ H04L 43/12 370/252 |

FOREIGN PATENT DOCUMENTS

| | | |
|---|---|---|
| EP | 2 741 103 A1 | 6/2014 |
| GB | 1 369 065 A | 10/1974 |
| GB | 2 329 072 A | 3/1999 |
| GB | 2 355 529 A | 4/2001 |
| WO | WO-94/28467 A1 | 12/1994 |
| WO | WO-96/04589 A1 | 2/1996 |
| WO | WO-2008/066682 A2 | 6/2008 |
| WO | WO-2010/017629 A1 | 2/2010 |

OTHER PUBLICATIONS

International Search Report and Written Opinion for Application No. PCT/GB2015/054062, dated May 18, 2016.
Search Report for Application No. GB1422690.6, dated Feb. 17, 2015.
Search Report for Application No. GB1422690.6, dated Jul. 7, 2015.
Search Report for Application No. GB1422690.6, dated Jun. 29, 2015.
Chi "Real-Time 3D Acoustical Imaging: Theory, Algorithm and System Design," published by Springer in 2019; ISBN 9811337446, 9789811337444.
Murino et al., "Three-dimensional image generation and processing in underwater acoustic vision," Proc. IEEE 88(12):1903-1948 (2000).
Trucco et al., "Devising an Affordable Sonar System for Underwater 3-D Vision," IEEE Transactions on Instrumentation and Measurement, 57(10):2348-2354 (2008).
Chen et al., "Optimization of the digital near-field beamforming for underwater 3-D sonar imaging system," IEEE Trans. Instrum. Meas. 59(2): 415-424 (2010).
Chi et al., "High-resolution real-time underwater 3-D acoustical imaging through designing ultralarge ultrasparse ultra-wideband 2-D arrays," IEEE Trans. Instrum. Meas. 66(10):2647-2657 (2017).
Chi et al., "Ultrawideband underwater real-time 3-D acoustical imaging with ultrasparse arrays," IEEE J. Ocean. Eng. 42(1):97-108 (2017).
Han et al., "A real-time 3-D underwater acoustical imaging system," IEEE J. Ocean. Eng. 39(4):620-629 (2014).
Hansen et al., "3D acoustic camera for underwater imaging," Acoustical Imaging, 20:723-727 (1993).
Hansen et al., "The application of real time 3D acoustical imaging," IEEE Oceanic Engineering Society. OCEANS'98. Conference Proceedings (Cat. No. 98CH36259). vol. 2. IEEE (1998).
Hansen et al.,"A 3D underwater acoustic camera-properties and applications," Acoustical Imaging, pp. 607-611 (1999).
Hansen, "Acoustical Imaging Using Spectral Decomposition in the Aperture Field," Acoustical Imaging, 19:103-107 (1992).
Liu et al., "A low complexity real-time 3-D sonar imaging system with a cross array," IEEE J. Ocean. Eng. 41(2):262-273 (2016).
Trucco, "Thinning and weighting of large planar arrays by simulated annealing," IEEE Trans. Ultrason. Ferroelectr. Freq. Control 46(2), 347-355 (1999).
Wang et al., "Design and implementation of 3D acoustical imaging sonar signal processing method based on TMS 320C6678," J. Naval Univ. Eng. 15(2):85-90 (2014).
Yuan et al., "Gain and phase autocalibration of large uniform rectangular arrays for underwater 3-D sonar imaging systems," IEEE J. Ocean. Eng. 39(3):458-471 (2014).

* cited by examiner

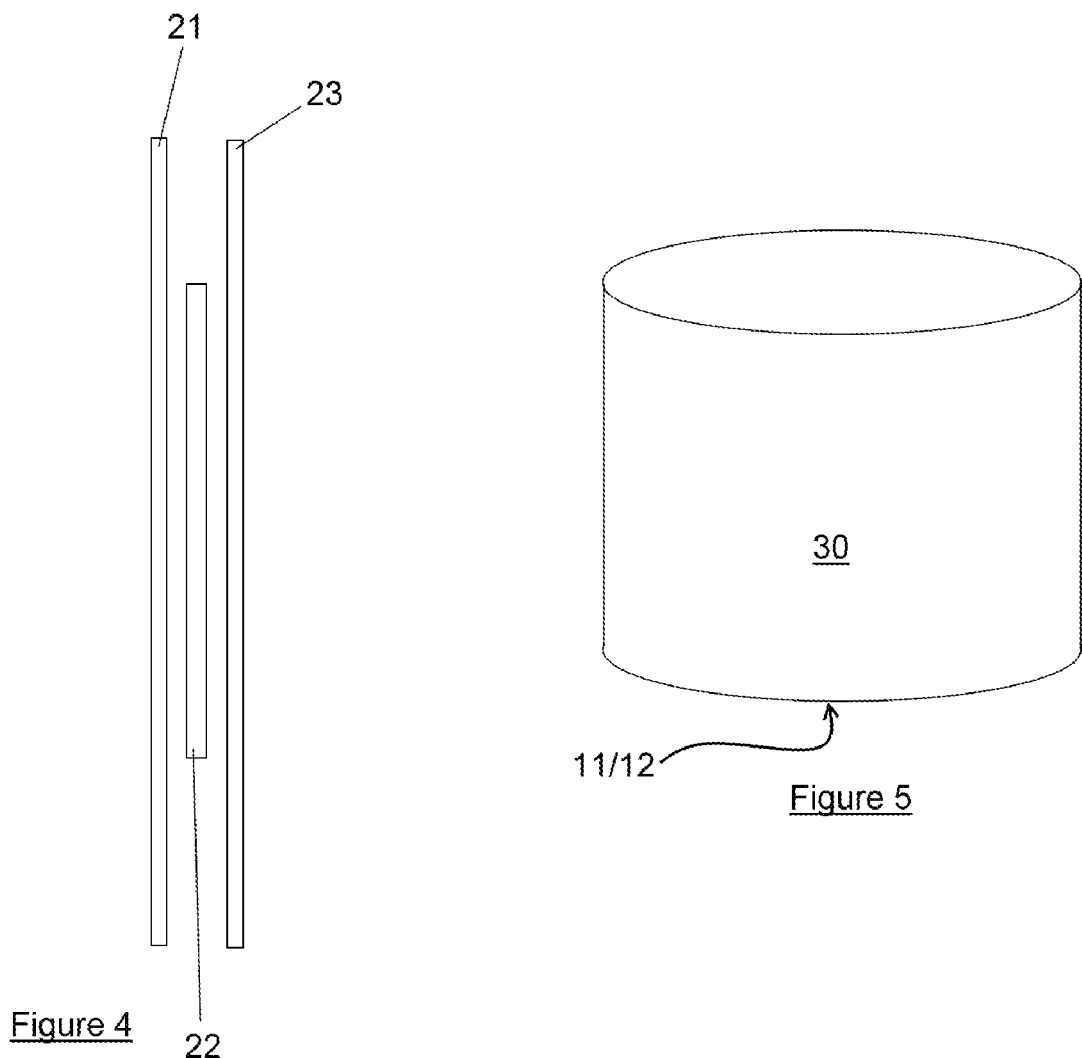

ASPECTS OF SONAR SYSTEMS OR OTHER ACOUSTIC IMAGING SYSTEMS

DESCRIPTION OF INVENTION

Embodiments of the present invention relate to sonar systems or other acoustic imaging systems and components thereof. More particularly, some aspects of the present invention relate to receive circuitry for a sonar system or other acoustic imaging system. Other aspects of the present invention relate to a transmit array and transmitter drive circuitry of a sonar system or other acoustic imaging system.

Sonar (Sound Navigation And Ranging) systems were developed in the early 1900s and active sonar systems are now commonly used for detecting objects underwater—for example, for performing underwater surveys, locating fish or submarines, and for general range finding as part of a navigation system.

An active sonar system operates by outputting a pulsed sound wave into a body of water from a transmitter of the system. The sound wave travels through the water as a compressional wave—i.e. a series of pressure fronts. The wave travels through the body of water until it encounters a change in the body of water, that change may be for example an object (such as the seabed if the body of water is the sea, fish, a submarine, etc). A portion of the sound wave will be reflected, a portion will be transmitted into the object, and a portion of the sound wave will be scattered generally in all directions. By detecting the time at which the reflected portion of the sound wave is received by a receiver of the system (relative to the time at which the wave was transmitted) and knowing the speed of the sound wave through the body of water, it is possible to determine the distance the sound wave has travelled between the transmitter and the receiver. The positions of the transmitter and receiver being known, it is then possible to generate an image of the object encountered by the sound wave.

As will be appreciated, the energy of the sound wave will dissipate as the distance the wave has travelled increases.

Modern sonar systems use transmitters and receivers which are in the form of an array of transmitters and receivers. The arrays of transmitters allow beamforming techniques to be used such that the sound waves output by the array of transmitters comprise a number of narrow beams or lobes, which are created by the constructive and destructive interference of the sound waves from the transmitters in the array. Similarly, the array of receivers can also be used to receive reflected sound waves within narrow beams.

With such modern arrays it is possible to provide a multibeam sonar system in which the system is configured to output sound waves in beams across a swath of the body of water. This allows fast and accurate surveys of the objects in that body of water to be performed.

Whilst there have been considerable developments in sonar technology, there is a general need to reduce the cost of the sonar systems so that they are more affordable and, therefore, more accessible. There is also a need to reduce the power consumption of such sonar systems, and reduce the amount of heat generated by such systems. Increasing the frequency range of operation of the systems is also desirable, particularly if there are no significant cost increases associated with the frequency range increase. There is also a desire to make the systems as small and robust as possible.

Existing transmitter arrays (or transmit arrays) often use arrays of lead zirconate titanate (PZT) piezoelectric devices, among others, to generate a sound wave. These arrays are designed, i.e. pre-configured, to produce a specific sound pulse shape for the type of sonar system in which they are used. For example, a broad and narrow pulse is used in bathymetry (e.g. $0.5°\times100°$), whilst a broad but wider pulse is used for sector scanning (e.g. $15°\times100°$), and a broad and narrow pulse is used to sidescan (e.g. $0.5°\times90°$). Once designed and constructed, these transmit arrays are typically limited to a specific type of sonar system. In addition many existing transmit array devices have limited bandwidth and this can cause distortion of the sound output by the array or constrain the use of the transmit array to specific frequencies or frequency ranges.

Such problems have been described in relation to sonar systems but may equally apply to other acoustic imaging systems such as ultrasound imaging systems which operate on a similar principle.

The present invention seeks to ameliorate one or more problems associated with the prior art.

An aspect of the present invention provides a sonar transmit array, comprising: a plurality of transmitters configured to generate an acoustic sonar signal, wherein at least one of the transmitters is a polyvinylidene difluoride, PVDF, piezoelectric device configured to generate at least part of the acoustic sonar signal.

The plurality of transmitters may be arranged in an array and the transmitters may include more than one thousand PVDF piezoelectric devices configured to generate at least part of the acoustic sonar signal.

The plurality of transmitters may be arranged in an array and the transmitters may include more than two thousand PVDF piezoelectric devices configured to generate at least part of the acoustic sonar signal.

The sonar transmit array may be also a sonar receive array.

Another aspect provides an acoustic imaging transmit array and transmitter drive circuitry, including a transmit array comprising a plurality of transmitters configured to generate an acoustic sonar signal, wherein at least one of the transmitters is a polyvinylidene difluoride, PVDF, piezoelectric device configured to generate at least part of the acoustic sonar signal; and wherein the transmitter drive circuitry is configured to drive the operation of one or more of the transmitters of the transmit array independently of one or more others of the transmitters of the transmit array, such that the transmit array is controllable to generate consecutive pulses which form beams of a different shape and/or direction with respect to each other.

The transmit array may also be a receive array.

Another aspect provides an acoustic imaging system including: transmitter drive circuitry configured to drive the operation of an acoustic imaging transmit array; receive array circuitry configured to receive one or more signals from an acoustic imaging receive array, wherein the receive array circuitry includes one or more isolation switch devices which are each configured to disconnect the receive array circuitry from the acoustic imaging receive array selectively dependent on an operating state of the transmitter drive circuitry.

The or each isolation switch device may operate asynchronously with the transmitter drive circuitry, such that the receive array circuitry is disconnected from the acoustic imaging receive array when transmitter drive circuitry is driving operation of the acoustic imaging transmit array.

The acoustic imaging system may further comprise one or more further isolation switches which are each configured to disconnect the transmitter drive circuitry from the acoustic imaging transmit array selectively, wherein the or each further isolation switch is operated asynchronously with respect to the or each isolation switch device.

The acoustic imaging system may further include the acoustic imaging transmit array.

The acoustic imaging transmit array may be a sonar transmit array as above.

The receive array circuitry may further comprise: a plurality of inputs, each input being configured to receive an analogue signal from a receiver of the acoustic imaging receive array; an analogue-to-digital converter configured to sample and convert analogue signals into corresponding digital signals; multiplexing circuitry configured to sequence the delivery of a plurality of the analogue signals to the analogue-to-digital converter in accordance with a multiplexing scheme; and beamforming circuitry configured to receive the digital signals from the analogue to digital converter and to generate an acoustic image from the digital signals, wherein the beamforming circuitry is configured to compensate for relative delays between samples captured by the analogue-to-digital converter.

The receive array circuitry may further comprise: a plurality of inputs, each input being configured to receive an analogue signal from a receiver of the acoustic imaging receive array; an analogue-to-digital converter configured to sample and convert analogue signals into corresponding digital signals; and beamforming circuitry configured to receive the digital signals from the analogue to digital converter and to generate an acoustic sonar image from the digital signals, wherein the analogue-to-digital converter is configured to sample the analogue signals at a sample rate which is determined based on a predetermined required bandwidth of the analogue signal or wherein the analogue-to-digital converter is configured to sample the analogue signals at a sample rate which is at least twice an operating frequency of the acoustic imaging system.

The receive array circuitry may further comprise: a plurality of inputs, each input being configured to receive an analogue signal from a receiver of the acoustic imaging receive array; an analogue-to-digital converter configured to sample and convert analogue signals into corresponding digital signals; an I/Q demodulator configured to receive the digital signals from the analogue to digital converter, to perform I/Q demodulation, and to pass the I/Q demodulated digital signals to the beamforming circuitry; and beamforming circuitry configured to receive the digital signals from the analogue to digital converter via the I/Q demodulator and to generate an acoustic image from the digital signals, wherein the I/Q demodulator uses an FIR Hilbert Transform filter.

The sonar system may further include a transmit array and a receive array, wherein the same array of devices provides the transmit array and the receive array.

Another aspect provides a receive array circuitry for an acoustic imaging system, comprising: a plurality of inputs, each input being configured to receive an analogue signal from a receiver of an acoustic imaging receive array; an analogue-to-digital converter configured to sample and convert analogue signals into corresponding digital signals; multiplexing circuitry configured to sequence the delivery of a plurality of the analogue signals to the analogue-to-digital converter in accordance with a multiplexing scheme; and beamforming circuitry configured to receive the digital signals from the analogue to digital converter and to generate an acoustic image from the digital signals, wherein the beamforming circuitry is configured to compensate for relative delays between samples captured by the analogue-to-digital converter.

The plurality of inputs may be a plurality of inputs from a substantially planar acoustic imaging receive array.

The plurality of inputs may be a plurality of inputs from a curved acoustic imaging receive array.

The beamforming circuitry may be configured to use a spectral decomposition of the aperture field technique to generate the acoustic image.

The analogue-to-digital converter may be configured to sample the analogue signals at a sample rate which is determined based on a predetermined required bandwidth of the analogue signal or the analogue-to-digital converter may be configured to sample the analogue signals at a sample rate which is at least twice an operating frequency of the acoustic imaging system.

The predetermined required bandwidth of the analogue signal may be selected based on the required range resolution for the acoustic imaging system.

The analogue-to-digital converter may be further configured to receive a user selected range resolution.

The sample rate may be substantially equal to or greater than twice the predetermined bandwidth of the analogue signal or the sample rate may be at least twice an operating frequency of the acoustic imaging system.

The sample rate may be less than twice an operating frequency of the acoustic imaging system.

The sample rate may be a fraction of the operating frequency of the acoustic imaging system.

Receive array circuitry may further comprise an I/Q demodulator configured to receive the digital signals from the analogue to digital converter, to perform I/Q demodulation, and to pass the I/Q demodulated digital signals to the beamforming circuitry.

The I/Q demodulator may use an FIR Hilbert Transform filter.

Another aspect provides a receive array circuitry for an acoustic imaging system, comprising: a plurality of inputs, each input being configured to receive an analogue signal from a receiver of an acoustic imaging receive array; an analogue-to-digital converter configured to sample and convert analogue signals into corresponding digital signals; and beamforming circuitry configured to receive the digital signals from the analogue to digital converter and to generate an acoustic image from the digital signals, wherein the analogue-to-digital converter is configured to sample the analogue signals at a sample rate which is determined based on a predetermined required bandwidth of the analogue signal.

The plurality of inputs may be a plurality of inputs from a substantially planar acoustic imaging receive array.

The plurality of inputs may be a plurality of inputs from a curved acoustic imaging receive array.

The predetermined required bandwidth of the analogue signal may be selected based on the required range resolution for the acoustic imaging system.

The analogue-to-digital converter may be further configured to receive a user selected range resolution.

The sample rate may be substantially equal to or greater than twice the predetermined bandwidth of the analogue signal.

The sample rate may be less than twice an operating frequency of the acoustic imaging system.

The sample rate may be a fraction of the operating frequency of the acoustic imaging system.

The receive array circuitry may further comprise an I/Q demodulator configured to receive the digital signals from the analogue to digital converter, to perform I/Q demodulation, and to pass the I/Q demodulated digital signals to the beamforming circuitry.

The I/Q demodulator may use an FIR Hilbert Transform filter.

The receive array circuitry may further comprise multiplexing circuitry configured to sequence the delivery of a plurality of the analogue signals to the analogue-to-digital converter in accordance with a multiplexing scheme and wherein the beamforming circuitry is configured to compensate for relative delays between samples captured by the analogue-to-digital converter.

The beamforming circuitry may be configured to use a spectral decomposition of the aperture field technique to generate the acoustic image.

Another aspect provides receive array circuitry for an acoustic imaging system, comprising: a plurality of inputs, each input being configured to receive an analogue signal from a receiver of an acoustic imaging receive array; an analogue-to-digital converter configured to sample and convert analogue signals into corresponding digital signals; an I/Q demodulator configured to receive the digital signals from the analogue to digital converter, to perform I/Q demodulation, and to pass the I/Q demodulated digital signals to the beamforming circuitry; and beamforming circuitry configured to receive the digital signals from the analogue to digital converter via the I/Q demodulator and to generate an acoustic image from the digital signals, wherein the I/Q demodulator uses an FIR Hilbert Transform filter.

Another aspect provides an acoustic imaging system including receive array circuitry as above and/or a sonar transmit array as above.

The acoustic imaging system may further comprise a receive array.

Another aspect provides a vessel including an acoustic imaging as above.

Another aspect provides a method of retrofitting an acoustic imaging system with receive array circuitry comprising: replacing at least one component of an acoustic imaging system with at least one component of the receive array circuitry to provide receive array circuitry as above in the acoustic imaging system.

Embodiments of the present invention are described herein, by way of example only, with reference to the accompanying drawings, in which:

FIG. 4 depicts circuit boards of an example embodiment; and

FIG. 5 depicts a housing of an example embodiment; and

Figure 1:
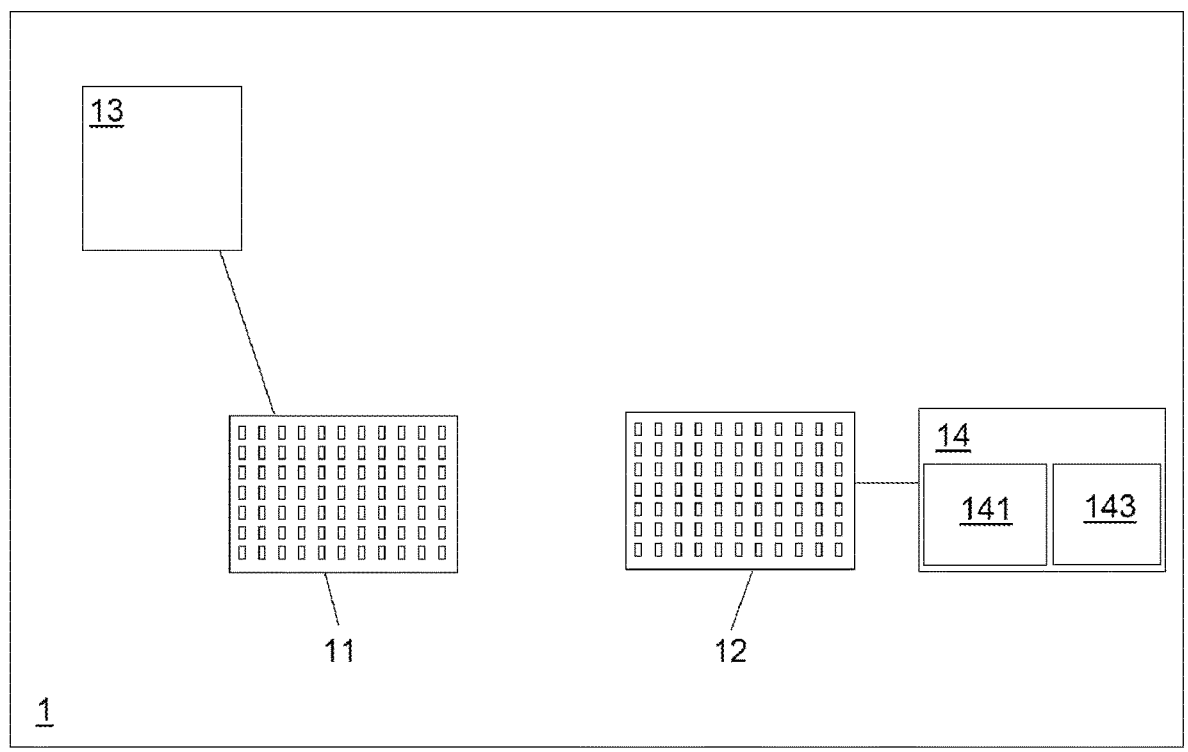
FIG. 1 depicts a sonar system of an example embodiment.

With reference to FIG. 1, embodiments of the present invention include a sonar system 1. The sonar system 1 includes a transmitter (which may be a plurality of transmitter devices or elements which may be arranged in an array (known as a transmit array 11)) and an array of receivers (known as a receive array 12).

The receive array 12 and the transmit array 11 may be provided by the same array of transmitter-receiver devices or elements, or the receive array 12 and transmit array 11 may be separate and distinct arrays of devices or elements. The description of embodiments of the present invention should be read accordingly. In some embodiments the receive array 12 and/or the transmit array 11 (or the combined receive-and-transmit array) may be an F×G device of element array, wherein F and G are both greater than one and, in some embodiments, F may be equal to G (such that the array is a square array). Therefore, discussion herein as to the number of elements or devices in the receive 12 or transmit arrays 11 may apply, in some embodiments, to other of the receive 12 or transmit arrays 11 as well.

The receive array 12 may be positioned in a grid-like formation with the receivers in a first plane and the transmitter (e.g. the transmit array 11) in a second plane (in some embodiments, the first and second planes are the same plane). The receive array 12, therefore, comprises columns and rows of receivers. Such an array may be referred to as a 2D array because the receivers are in a common plane. In some embodiments, the transmitter (e.g. the transmit array 11) also comprises a 2D array of transmitters (e.g. arranged in columns and rows, in the second plane). The first and second planes may be 5-10 cm (e.g. 8-10 cm) apart in some embodiments. In some embodiments, one or both of the first and second planes is substantially flat but in other embodiments is curved.

In some embodiments, the receive array 12 comprises a forty eight by forty eight array of receivers giving a total of two thousand three hundred and four receivers in the receive array 12. Each receiver in the receive array 12 may be referred to as a receive element and may be a polyvinylidene difluoride (PVDF) piezoelectric device. Other sizes of array are envisaged; however, for ease of explanation, a forty eight by forty eight receive array 12 is used herein as an example. In some embodiments, the receive array 12 has a width of about 20 cm and a height of about 20 cm. It will be appreciated that the explanation of the operation of aspects of the invention will apply to other sizes of receive array 12 with appropriate scaled modifications to the calculations and hardware requirements.

The transmitter (e.g. the transmit array 11) is configured to output a sound wave for use in a sonar technique and the receive array 12 is configured to receive the sound wave (reflected from an object).

The transmitter (e.g. the transmit array 11) and receive array 12 are generally spaced apart from each other. In some embodiments the transmitter (e.g. the transmit array 11) and receive array 12 are housed as a single unit in one housing (for example, in a transducer head of the sonar system 1). The transmitter (e.g. the transmit array 11) and the receive array 12 may be generally located close to each other to reduce parallax errors. Of course, in some embodiments, the transmit array 11 and receive array 12 are the same array.

In some embodiments, a plurality of transmitters (e.g. transmit arrays 11) and receive arrays 12 may be provided. The pluralities may be in respective transmitter-receive array 11,12 pairs—each pair being housed in one housing, for example, but not necessarily the same housing as another pair (which may be in a separate housing).

The sonar system 1 is configured such that the transmitter (e.g. the transmit array 11) transmits sound waves into a body of water and the receive array 12 receives reflected sound waves from the body of water. The transmitter (e.g. the transmit array 11) may be configured to transmit sound waves in the form of a chirp signal (i.e. using chirp modulation or linear frequency modulation). The transmitter (e.g. the transmit array 11) may be configured to transmit sound waves in the form of a continuous waveform signal (i.e. a CW signal).

Accordingly, the sonar system 1 is configured to be at least partially submerged in the body of water during use.

For example, at least part of the sonar system 1 (e.g. the transmitter 11 and receive array 12) may secured to a vessel—i.e. a ship, boat, or submarine—or may be towed behind such a vessel. Other parts of the sonar system 1 may be located separately—e.g. at a sonar station within the vessel or at a remote location (which may be another vessel or a land-based facility). At least part of the sonar system 1 may be provided as part of an installation which may be part of a vessel or which may be a land-based installation or which may be located in an aircraft, for example.

The transmitter (e.g. the transmit array 11) may be coupled in electrical communication with transmitter circuitry 13 of the sonar system 1 and, similarly, the receive array 12 may be coupled in electrical communication with receive array circuitry 14.

The transmitter circuitry 13 is configured to drive the operation of the transmitter or transmitters (e.g. the transmit array or arrays 11) to output a sound wave in a predetermined manner—for example, as a series of pulses or pings. In some embodiments, the or each transmitter (e.g. the transmit array 11) is driven to output an acoustic signal with an operating frequency (i.e. a carrier frequency) which may be an operating frequency of about 375 kHz (or any other suitable operating frequency). In some embodiments, the operating frequency is between about 10 and about 1000 kHz. In some embodiments, the operating frequency is between about 20 and about 500 kHz. In some embodiments, the operating frequency is between about 80 and about 500 kHz. As will be appreciated, the transmitter circuitry 13 may be configured to drive the operation of the transmitter or transmitters (e.g. the transmit array or arrays 11) to output sound in the form of a chirp signal (i.e. using chirp modulation or linear frequency modulation) or a continuous waveform signal.

The transmitter may, as described herein, be an array (the transmit array 11) and, in some embodiments, each transmitter device or element in the transmit array 11 may comprise a PVDF piezoelectric device (or at least one of the transmitters 11 is a PVDF piezoelectric device). PVDF piezoelectric devices have a high bandwidth and, therefore, are capable of outputting the acoustic signal which is less distorted than may be the case with conventional devices. This, in turn, means that the operation of the array of transmitter devices or elements can be controlled accurately. There was conventionally a bias in the art against the use of PVDF piezoelectric devices for transmitter devices or elements in sonar systems due to the voltage issues and the area required for an effective transmit array 11. The inventors have, therefore, surprisingly found that such devices can be used.

In some embodiments, each transmitter device or element of the transmit array 11 may each comprise a respective disc of conductive material, such as copper, over which there may be provided a PVDF film (which may be around 100 µm thick). The disc of conductive material may be provided on a substrate—such as a printed circuit board. The PVDF film may cover a plurality of discs of conductive material which may each, therefore, define a respective transmitter 11. In embodiments, in which the same array of devices or elements is provided for both the transmit array 11 and the receive array 12, each conductive disc may form both a receive element and a transmitter device or element.

In some embodiments, the transmitter circuitry 13 is configured to control the operation of the transmitter devices or elements (i.e. of the transmit array 11) in order to generate different shapes and/or directions of acoustic beam of acoustic signal. Therefore, in some embodiments, consecutive pulses of acoustic signal output by the transmitter devices or elements (i.e. by the (e.g. the transmit array 11) may form a beam of a different shape and/or direction.

In some embodiments, a first beam pulse shape output by the transmitter devices or elements (i.e. by the transmit array 11) is a pulse suitable for one of bathymetry, sector scanning, and side scan sonar. In some embodiments, a second beam pulse shape output by the transmitter devices or elements (i.e. the transmit array 11) immediately after the first beam pulse, is a pulse suitable for another one of bathymetry, sector scanning, and side scan sonar.

In some embodiments, the transmitter devices or elements (i.e. the transmit array 11) are controlled by the transmitter circuitry 13 to output an acoustic signal which forms a beam in the form of a cone, which may be a 50° cone. In some embodiments, the transmitter devices or elements (i.e. the transmit array 11) are controlled by the transmitter circuitry 13 to output an acoustic signal which forms a beam in the form of a column or spotlight-like beam. In some embodiments, the transmitter devices or elements (i.e. the transmit array 11) are controlled by the transmitter circuitry 13 to output an acoustic signal in the form of parametric pulses—which may be used for seabed penetration (e.g. sub-bottom profiling (SBP)).

In some embodiments, the transmitter devices or elements (i.e. the transmit array 11) are controlled by the transmitter circuitry 13 to output an acoustic signal in the form pulses which are usable for measuring the speed of motion of the sonar system 1 and, therefore, in some embodiments, the vessel to which the sonar system 1 is mounted—these may include Doppler velocity log (DVL) and correlation velocity log pulses.

In some embodiments, there are a relatively large number of transmitter devices or elements in the transmit array 11. In some embodiments, there are more than 1000 transmitter devices or elements in the transmit array 11, or more than 2000 transmitter devices or elements or more than 3000 transmitter devices or elements, or more than 4000 transmitter devices or elements, or more than 5000 transmitter devices or elements. In some embodiments, the transmit array 11 comprises an array of 5632 transmitter devices or elements.

Compared to some conventional transmitter devices or elements, PVDF piezoelectric devices require a relatively high voltage to drive their operation for a given power of output of acoustic signal (i.e. acoustic sonar signal).

Accordingly, for a given output acoustic signal power, the larger the number of PVDF piezoelectric devices forming the transmitter devices or elements of the transmit array 11, the lower the voltage which has to be applied to each PVDF piezoelectric device to achieve the given acoustic power output. The relatively large number of PVDF piezoelectric devices used as transmitter devices or elements in accordance with some embodiments, allows PVDF piezoelectric devices to be used effectively at manageable voltage levels (e.g. between 5V and 50V RMS or around 11V RMS).

Figure 6:
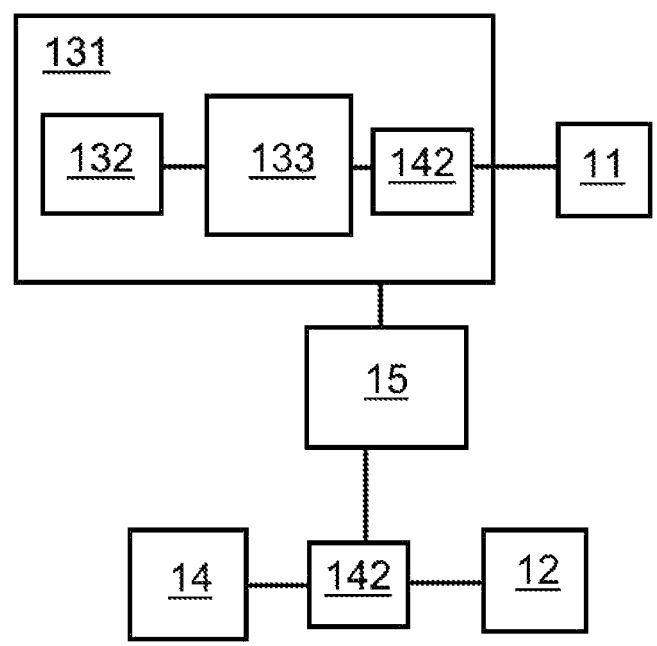
FIG. 6 depicts parts of a sonar system of some embodiments.

The transmitter devices or elements of the transmit array 11 may, in some embodiments, be coupled to a transmitter drive circuit 131 of the transmitter circuit 13 (see FIG. 6, for example).

The transmitter drive circuit 131 may include one or more digital-to-analog converters 132 (or, for example, a direct digital synthesiser (DDS), such as the AD9837 device from Analog Electronics) which are configured to drive the operation of one or more of the transmitter devices or elements. In some embodiments, the transmitter drive circuit 131 is configured to drive the operation of each of the transmitter devices or elements of the transmit array 11 independently. In some embodiments, the transmitter drive circuit 131 is configured to drive the operation of one or more groups of transmitter devices or elements of the transmit array 11 in unison—with each transmitter device or element of each respective group being driven together. Accordingly, in some embodiments, each transmitter device or element is coupled to be driven by a respective digital-to-analog converter 132 of the transmitter drive circuit 131 and, in some embodiments, a single digital-to-analog converter 132 is configured to drive a group of transmitter devices or elements.

The or each digital-to-analog converter 132 may be configured to output a respective transmit analog signal to a respective amplifier 133 of the transmitter drive circuit 131. Accordingly, the transmitter drive circuit 131 may include one or more amplifiers 133 which are configured to receive respective transmit analog signals from the analog-to-digital converter or converters 132 and to output respective amplified transmit signals to the or each transmitter device or element of the transmit array 11 to drive the operation thereof.

The or each digital-to-analog converter 132 is configured to receive a transmit digital signal and to convert the transmit digital signal into an transmit analog signal output. The transmit digital signal may be received from a controller 15 of the sonar system 1, which may be a controller 15 of the transmitter circuitry 13 (e.g. of the transmitter drive circuit 131). The controller 15 may include one or more processors (e.g. microprocessors) which are configured to output one or more transmit digital signals to the or each digital-to-analog converter 132.

The controller 15 may be configured to control one or more aspects of the operation of the receive array circuitry 14. In some embodiments, the controller 15 may be configured to operate the transmitter drive circuit 131 asynchronously with respect to the receive array circuitry 14.

In particular, the controller 15 may be configured to disconnect one or more parts of the receive array circuitry 14 from the receive array 12 when the transmit array 11 is transmitting (e.g. when the transmitter drive circuit 131 is outputting a signal or signals (which may be the amplified transmit signal or signals) to drive the operation of the transmitter devices or elements of the transmit array 11. In some embodiments, channel circuitry 141 and/or beamforming circuitry 143 of the receive array circuitry 14 is the one or more parts which are disconnected. In this sense, 'disconnection' means disconnection from electrical communication.

The disconnection of at least part of the receive array circuitry 14 in this manner helps to reduce the risk of damage to the receive array circuitry 14 when the relatively high voltage signal(s) to drive the transmit array 11 is output to the transmitter devices or elements.

The disconnection of at least part of the receive array circuitry 14 allows close placement of the receive array 13 and the transmit array 11, with reduced risk of damage to the receive array circuitry 14. Indeed, the disconnection may allow, as described herein, the receive array 13 and transmit array 11 to be provided as the same array of devices or elements.

Disconnection of at least part of the receive array circuitry 14 may be achieved by the use of one or more isolation switch devices 142, which may form part of the receive array circuitry 14 and/or the transmitter drive circuit 131.

In some embodiments, the isolation switch devices 142 may include a respective isolation switch device 142 associated with each receive element of the receive array 12 or, in some embodiments, a respective isolation switch device 142 may be associated with a group of receive elements of the receive array 12. Accordingly, the or each isolation switch device 142 may be configured to couple, selectively, the associated receive element(s) of the receive array 12 with the one or more parts of the receive array circuitry 14—as described herein.

In some embodiments, the isolation switch devices 142 may include a respective isolation switch device 142 associated with each transmitter device or element of the transmit array 11 or, in some embodiments, a respective isolation switch device 142 may be associated with a group of transmitter devices or elements of the transmit array 11. Accordingly, the or each isolation switch device 142 may be configured to couple, selectively, the associated transmitter device or element of the transmit array 11 with the one or more parts of the transmitter drive circuitry 131. The or each isolation switch 142 associated with at least one transmitter device or element may be operated asynchronously with respect to the operation of the or each isolation switch 142 associated with at least one receive element of the receive array 12. This operation of the or each isolation switch 142 may be controlled by the controller 15.

In some embodiments, the or each isolation switch 142 includes a respective active switch device—such as a field effect transistor. In some embodiments, the or each isolation switch 142 is a discrete electronic component (e.g. instead of multiple isolation switches 142 being provided in a single integrated circuit).

In some embodiments, the or each isolation switch 142 is provided on the opposing side of a substrate (as described above) to the transmitter(s) 11 and/or receive elements. This may provide a compact construction.

Of course, in some embodiments, each element of the receive array 12 is also an element of the transmit array 11.

The receive array circuitry 14 is configured to receive one or more signals from the receivers of the receive array 12 and to pre-process those signals—either for use in their pre-processed form or for further processing to occur. The one or more signals from the receivers are generated by the receivers in response to detected sound waves at the receivers. Accordingly, each of the one or more signals is representative of a sound wave detected by a receiver of the receive array 12. Collectively, the information carried by the one or more signals is referred to herein as receive array data. The one or more signals from the receive array 12 are typically each analogue signals.

The receive array circuitry 14 includes channel circuitry 141 and beamforming circuitry 143 for pre-processing the receive array data.

The or each analogue signal is provided to the channel circuitry (or channel 'boards') 141 which may, in turn, comprise various filters, amplifiers, and other circuit elements including an analogue-to-digital converter 1411. The circuit elements of the channel circuitry 141 form channels for the or each signal on which they act.

The analogue-to-digital converter 1411 may comprise an array of analogue-to-digital converter devices 1411a such that the or each analogue signal may be converted by a respective analogue-to-digital converter device 1411a into a respective digital signal. Each analogue-to-digital converter device 1411a may form part of a respective channel, as mentioned above. As such each digital signal may be described as 'channel data' on which further processing is performed.

The analogue-to-digital converter 1411 is configured to sample the or each analogue signal (the receive array data) for conversion into one or more corresponding digital signals (the channel data).

In some embodiments, following conversion of the or each analogue signal into a respective digital signal, the channel data may then be I/Q demodulated in an I/Q demodulator 1412 and the channel data output by the I/Q demodulator 1412 may be demodulated channel data in the form of digital output signals which include both complex and real parts. In other embodiments, other signal processing may be performed on the channel data output by the analogue-to-digital converter 1411.

In some embodiments, the I/Q demodulator 1412 may operate on a first set of samples of signals from the receive array 12 to determine the in-phase component, 'I', and a second set of samples of signals from the receive array 12 to determine the quadrature component, 'Q'.

The demodulated channel data may then be passed to a low pass filter 1413 and then may be passed to a decimator 1414 which decimates (or sub-samples) the channel data to reduce the effective sampling rate—to reduce computational overheads in the beamforming circuitry 143 and later processing stages (if applicable).

The digital output signals from the channel circuitry 141 may be provided from the channel circuitry 141 to the beamforming circuitry 143 (or beamforming 'boards'). The beamforming circuitry 143 is configured to process the digital data it receives from the channel circuitry 141 in accordance with conventional beamforming techniques so as to identify data within the received data which relates to specific narrow beams within the receive array data. This data can then be analysed to determine the location of one or more objects with respect to the sonar system 1 or a part thereof (for example, the seabed, a vessel, or fish). In some embodiments, the beamforming circuitry 143 may be configured to process the digital data it receives from the channel circuitry 141 to identify data which relates to a one hundred and twenty eight by one hundred and twenty eight array of beams—although other array sizes are possible in other embodiments.

In some conventional sonar systems, similar channel circuitry is used in which samples of the or each analogue signal are taken at a rate of 2M samples/s. As will be appreciated, in some conventional sonar systems, with a 375 kHz operating frequency, and separate samples taken to determine the in-phase and quadrature components, a minimum sampling frequency would be understood to be 1.5M samples/s (i.e. for each of the samples for the in-phase and quadrature components, a sampling rate of 750 kHz would be used). In some conventional sonar systems, there is oversampling in order to allow for additional filtering to be performed or to accommodate the possibility of higher operating frequencies (e.g. a rate of 2M samples/s allows an operating frequency as high as 500 kHz). The samples are converted by a similar analogue-to-digital converter to output digital words of 12-bit length at a rate of 55.3 GBits/s for a forty eight by forty eight receive array 12 (which collects one set of samples for determining the in-phase component and another set of samples for determining the quadrature component), for example. This sampled data is then I/Q demodulated with an effective sampling frequency of 1 MHz (which is the Nyquist sampling rate for a signal with a frequency of 500 kHz). This data is then low-pass filtered and sub-sampled by a factor of 12 to provide an effective sampling frequency of 75 kHz (which is the Nyquist sampling rate for a signal with a frequency of 37.5 kHz). In other words, an output from the channel circuitry may be in the form of 12-bit digital words output at a rate of 75 k samples/s for each data channel (i.e. 2.07 Gbits/s for a forty eight by forty eight receive array 12). This provides a range resolution of 2 cm (e.g. for a continuous wave signal or may be greater for a chirp signal). Thus, in such a conventional system, the data output by the channel circuitry is just 1/13 of the data available after the initial sampling and digitisation.

In other words, it was conventionally thought that outputs from the receive array 12 would need to be sampled at, at least, the Nyquist sampling rate (i.e. double the maximum frequency of the analogue signal (i.e. the operating frequency)). So, for example, a sampling rate of 750 kHz would be required for a 375 kHz operating frequency.

Whilst some embodiments of the present invention may use a substantially conventional sampling technique—sampling the outputs from the receive array 12 at, at least, the Nyquist sampling rate, in accordance with some embodiments of the invention, some such conventional, modified, or novel sonar systems can achieve identical or substantially identical results with a sampling frequency which is determined by the bandwidth of the analogue signal. The bandwidth relates only to the required range resolution. Therefore, for a range resolution of 1 cm with a 375 kHz operating frequency, there is a required bandwidth of 75 kHz and so a Nyquist sampling rate of 150 kHz, where the bandwidth required for that range resolution is c/(2d), wherein 'c' is the speed of sound in water (about 1500 m/s) and 'd' is the range resolution in metres. Accordingly, a sampling rate for the outputs from the receive array 12 of 150 kHz, in this example, would be sufficient to provide substantially all the useful data to the beamforming circuitry 143 (although, in some embodiments, elements such as the decimator 1414 could be omitted as sub-sampling is not necessarily needed in accordance with embodiments).

In some embodiments, the analogue-to-digital converter 1411 may include one or more multiplexed analogue-to-digital converter devices 1411a which are each configured to convert more than one analogue signal (of the receive array data) into respective corresponding digital signals (the channel data). As such, there may be fewer analogue-to-digital converter devices 1411a than the number of receivers in the receive array 12.

Accordingly, in some embodiments, the channel circuitry 141 may include an array of pre-amplifiers 141a which are each configured to amplify a respective one of the analogue signals.

The channel circuitry 141 may further include an array of switch devices 141b (such as FET switch based devices) which are each configured to provide selectively one of two or more of the analogue signals to one of the analogue-to-digital converter devices 1411a. Accordingly, the array of switch devices 141b provide multiplexing circuitry 1415 configured to provide a plurality of the analogue signals selectively to a single of the analogue-to-digital converter device 1411a.

Thus, for example, in a forty eight by forty eight receive array 12, each of the forty eight receive elements in each row of the receive array 12 may be sampled in turn, from one end of the array to the opposing end of the array—working up (or down) the columns of the receive array 12. Each column, in such an example, may be provided with its own analogue-to-digital converter device 1411a. In some embodiments, such an arrangement is provided but there are a different number of rows and columns of receive elements in the receive array 12. In some embodiments, sampling is performed in a sequence from the centre of the receive array 12 outwards instead.

In some embodiments, the channel circuitry 141 may further include an array of band pass filters 141c which is connected between the pre-amplifiers 141a and the switch devices 141b. Each of the band pass filters 141c is configured to receive a one of the analogue signals (of the receive array data) and to apply a band pass function on that signal which is then passed towards a switch device 141b of the multiplexing circuitry 1415. The positioning of the band pass filters 141c between the pre-amplifiers 141a and the switch devices 141b (rather than between the switch devices 141b and the analogue-to-digital converter devices 1411a) may help to reduce the risk of propagation delays through the band pass filters 141c meaning that there is insufficient setup time for the analogue-to-digital converter devices 1411a—which would lead to interference of the samples and inaccurate digital signals being output by the analogue-to-digital converter devices 1411a.

In some embodiments, each band pass filter 141c may include a plurality of filters arranged in series.

In some embodiments, an array of further switch devices 141d may be provided between the pre-amplifiers 141a and band pass filters 141c. The array of further switch devices 141d may be configured to provide selectively one of at least two of the pre-amplified analogue signals to one of the band pass filters 141c—thus allowing two stages of multiplexing in some embodiments. However, in such arrangements, the analogue signals which are multiplexed must be selected to avoid the propagation delay through band pass filters 141c causing errors in the analogue-to-digital conversion by the analogue-to-digital converter devices 1411a. In other words, the further switch devices 141d may be used, in some embodiments, to schedule the outputs of the relatively slow band pass filters 141c to the analogue-to-digital converter devices 1411a. As will be appreciated, in embodiments with further switch devices 141d, there may be fewer band pass filters 141c compared to the number of pre-amplifiers 141a.

In particular, the receive array 12 may be configured as a grid of receivers arranged in rows and columns—as discussed above. The multiplexing may be achieved by sampling the analogue signals from the columns of receivers simultaneously but sampling each the analogue signals from each row of all columns slightly later than the previous one.

In some embodiments, the sampling may start at the centre of the receive array 12 and proceed in an outward direction with successive samples. In some embodiments, the sampling may be performed by rows or columns instead—in a similar manner to the sampling described above by the multiplexing circuitry 1415. Two successive samples provided to the same band pass filter 141c would be selected to ensure that the propagation delay from the receiver to the further switch devices 141d is greater than the propagation delay (or group delay) through the band pass filters 141c.

Sampling may be performed by the channel circuitry 141 as will be apparent.

In embodiments including the multiplexing circuitry 1415 and further switch devices 141d, the multiplex circuitry 1415 and further switch devices 141d (which might be collectively referred to as further multiplexing circuitry) may operate independently of each other.

In other embodiments, the further switch devices 141d are not provided and, instead, an array of band pass filters 141c is provided (each being configured to apply a band pass filter function to one of the analogue signals). Accordingly, instead of their being fewer band pass filters 141c than receivers in the receive array 12 (as may be achieved using multiplexing as described above), there may be a generally equal number of band pass filters 141c to the number of receivers in the receive array 12.

In embodiments, the channel circuitry 141 may further include an array of time varying gain (TVG) amplifiers 141e. The TVG amplifiers 141e may be located (i.e. connected) between the switch devices 141b (i.e. the multiplexing circuitry 1415) and the analogue-to-digital converter devices 1411a (i.e. the analogue-to-digital converter 1411). Therefore, as will be appreciated, there may be fewer TVG amplifiers 141e than the number of receivers in the receive array 12 (as achieved by the multiplexing described above). The TVG amplifiers 141e are configured to compensate for the attenuation of a sound signal as it passes through the body of water. This attenuation is largely due to the spreading of the signal through the water. For an omnidirectional emitter, the attenuation would typically be −20.log R dB (where R is the distance travelled by the signal). However, reflected signals are, in practice, not omnidirectional. Therefore, although a signal emitted by the transmitter 11 may have an attenuation close to the above, the attenuation of the reflected signal may be different. The TVG amplifiers 141e may, therefore, be configured to receive a user input to fine tune the gain of the TVG amplifiers 141e to accommodate different attenuations when in use.

A variable gain amplifier such as the AD8338 device, by Analog Devices, Inc, is one possible example of a device which could be used to implement each TVG amplifier 141e.

In some embodiments, the array of TVG amplifiers 141e may be connected between receive array 12 and the multiplexing circuitry 1415, instead of between the multiplexing circuitry 1415 and the analogue-to-digital converter 1411. The array of TVG amplifiers 141e may be connected to receive signals from the band pass filters 141c (or other component connected between the band pass filters 141c and the array of TVG amplifiers 141e) or may be connected to send signals to the band pass filters 141c (or other component connected between the array of TVG amplifier 141e and the band pass filter 141c). Similarly, in some embodiments, the array of pre-amplifiers 141a may be connected between the multiplexing circuitry 1415 and the analogue-to-digital converter 1411 instead of between receive array 12 and the multiplexing circuitry 1415.

The two stages of multiplexing may be useful in embodiments in which the TVG amplifiers 141e constrain the number of multiplexed signals that can be handled.

Use of TVG amplifiers 141e allow echoes (i.e. reflected sound signals) from distant objects to be amplified more than echoes from closer objects.

Figure 2:
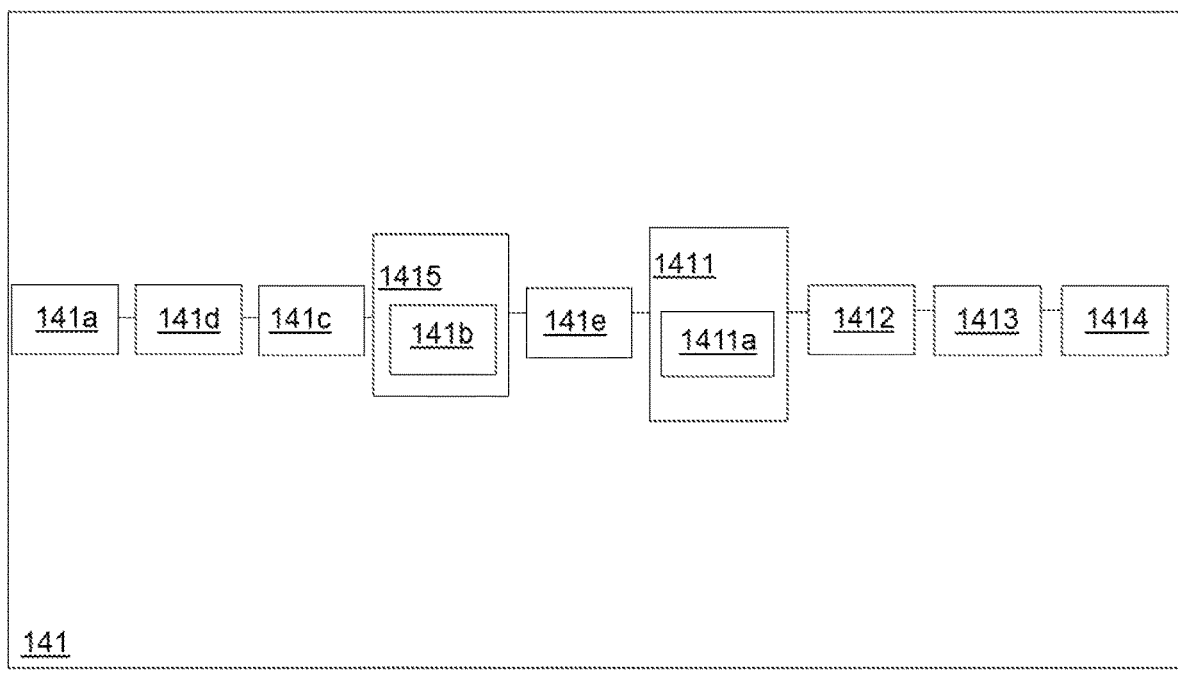
FIG. 2 depicts channel circuitry of an example embodiment.
Figure 3:
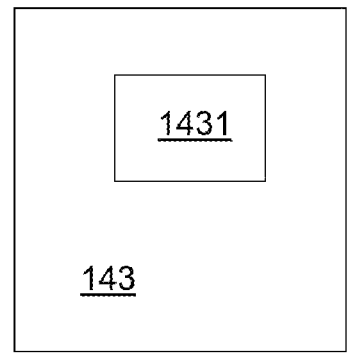
FIG. 3 depicts beamforming circuitry of an example embodiment.

In some embodiments, fixed gain amplifiers may be used instead of TVG amplifiers 141e, connected in much the same manner (see 141e in FIG. 2, for example). In such embodiments, the fixed gain amplifiers may be connected between the switch devices 141b (i.e. the multiplexing circuitry 1415) and the analogue-to-digital converter devices 1411a (i.e. the analogue-to-digital converter 1411) or between the receive array 12 and the multiplexing circuitry 1415. Each of the fixed gain amplifiers may be configured to receive a signal from the switch devices 141b or receive array 12, as the case may be, in succession. Each of the fixed gain amplifiers may be configured to amplify each received signal in accordance with a fixed gain for that fixed gain amplifier. Accordingly, the fixed gain amplifiers may be configured to output a plurality of amplified signals for each received signal, each of the plurality of amplified signals having been amplified by a predetermined amount, i.e. gain, according to which of the fixed gain amplifiers output generated the amplified signal.

The analogue-to-digital converter 1411 may be configured to determine which of the amplified signals to use based on the operating range of the analogue-to-digital converter 1411 (e.g. the range of signal voltage that the analogue-to-digital converter 1411 can convert).

The analogue-to-digital converter 1411 may be further configured to output, with the digital signals, an indication of which amplifier of the fixed gain amplifiers was used. This output may be in the form of a scaling factor, which may be a digital word (e.g. a byte) associated with the digital signal or a part of the signal.

Unused amplified signals from the fixed gain amplifiers may be discarded.

For example, for a range of up to 200 m, the usual maximum TVG amplification is 40 log R dB (where R is the distance to the target), or about 92 dB. If the fixed gain amplifiers had gains of 10 dB, 82 dB and 154 dB respectively, an effective range of about 2 m to about 7 km would be adequately amplified to be digitised correctly by the analogue-to-digital converter 1411 (assuming an appropriately powerful pulse had been transmitted). In such an example one of the three fixed gain amplifiers would output an amplified signal which can be converted accurately by the analogue-to-digital converter 1411. This may, for example, be the fixed gain amplifier with the 82 dB gain.

The dynamic ranges of the fixed gain amplifiers may overlap. Thus, with the information indicating which fixed gain amplifier was used, the analogue-to-digital converter devices 1411a may, in some embodiments, output a digital signal with an effectively larger dynamic range and number of bits.

For a 16 bit analogue-to-digital converter device 1411a the dynamic range may be about 96 dB. Therefore, in the above example the ranges of the digital signals output by the fixed gain amplifiers with 82 dB and 154 dB gains will overlap for 10 dB (approximately 2 bits). Similarly, the ranges of the digital signals output by the fixed gain amplifiers with 10 dB and 82 dB gains will overlap by 24 dB (approximately 4 bits). Effectively, the 16 bit analogue-to-digital converter device 1411a has been used to create a 42 bit, 250 dB digital signal.

As will be appreciated, each analogue-to-digital converter device 1411a may be associated with (i.e. configured to receive an amplified signal directly or indirectly from) a plurality of fixed gain amplifiers with respective different gains (i.e. a group of fixed gain amplifiers). In some embodiments, each analogue-to-digital converter device 1411a is associated with three such fixed gain amplifiers. The gains of each group of fixed gain amplifiers for a particular analogue-to-digital converter device 1411a may have the same gains as each other group of fixed gain amplifiers.

As will be appreciated, multiplexing as used herein is a reference to the sequencing of the delivery of the analogue signals to another circuit component—be it the analogue-to-digital converter 1411 for sampling or to the band pass filters 141c. The multiplexing (or sequencing) is in accordance with a predetermined scheme—as discussed above.

The I/Q demodulator 1412 may operate, in some embodiments, by using signals from the receive array 12 which are sampled (and converted into digital signals) by the analogue-to-digital converter 1411 at a sampling frequency which is twice the bandwidth of the analogue signal or twice (or more) of the operating frequency of the sonar system 1—depending on the sampling technique used, as described herein. The I/Q demodulator 1412 may obtain a cosine and a sine component of the output sound wave from the transmitter 11 at substantially the moment (i.e. instant) each sample is taken by the analogue-to-digital converter 141. The digital signal output by the analogue-to-digital converter 141 is then used by the I/Q demodulator to determine a value for the in-phase and quadrature components of the signal by multiplying the digital signal by the cosine component of the sound wave to give the in-phase component and by the −sine component of the sound wave to give the quadrature component. Thus, in such embodiments, it is not necessary to take separate samples for determining the in-phase and quadrature components—as is the case in other embodiments.

The beamforming circuitry 143 may include a processor 1431 which is configured to perform one or more operations on the digital channel data received from the channel circuitry 141. The processor 1431 may be a dedicated or general purpose processor and may be a Field Programmable Gate Array device or other programmable logic device.

The beamforming circuitry 143 may be configured to use spectral decomposition of the aperture field (SDAF) techniques to generate image data from the digital channel data received from the channel circuitry 141.

The SDAF technique is an example of a pseudo-inverse technique and embodiments of the invention could employ pseudo-inverse techniques other than the SDAF technique.

The pseudo-inverse techniques are advantageous, in relation to embodiments of the present invention, because they do not require assumptions regarding the simultaneity of the samples from the receivers of the receive array 12. As will be appreciated from the above discussion of embodiments of the invention, multiplexing in the manner described means that not all samples are simultaneously collected. By controlling which samples are collected simultaneously as part of the multiplexing process (e.g. all column of receivers being simultaneously sampled but each row of all columns being sampled later than the preceding row) allows the effect of the delays to be predicted, quantified, and (if necessary) compensatory action can be taken accordingly. Indeed, in the multiplexing scheme example given above the effect of the delays will be as if the pitch of the receive array 12 had been altered.

In accordance with the SDAF technique, the vector of the sound waves received at the receive array 12 ($s(w, p)$) can be defined as:

$$s(w,p)=U(w,p,r)c(w,r)$$

where
  $s(w, p)$ is the vector of the received sound waves and is of size N×1;
  $U(w, p, r)$ is a propagation matrix which describes how an acoustic signal reflected, of one of the beams defined by the beamforming circuitry 143, by an object will appear at each receiver of the receive array 12; and
  $c(w, r)$ is a vector of scattering objects (i.e. the objects from which the sound wave has reflected) of size M×1.
  'c' is the data representing the image of the object which has reflected the sound waves and is what the beamforming circuitry 143 seeks to determine (i.e. a vector of the scattering elements' reflectivity of size M×1). Of course, 's' is what is measured by the receive array 12 and 'U' is known from the design of the sonar system 1.

In some embodiments, the vector 's' is composed of N Fourier transforms of the digital channel data. In some instances neither matrix 'U' nor vector 's' are required—for example, in embodiments in which a fixed frequency pulse is being transmitted and I/Q demodulation of the received waveform has been performed.

A best estimate, $\tilde{c}$, for c may be determined from the minimum-norm solution of the above equation:

$$\tilde{c} = U^H (UU^H)^+ s$$

where $^H$ is the complex conjugate and transpose, and $^+$ is the pseudo-inverse.

Each element in U can be defined as:

$$u_{l,i} = Q(\omega) e^{j(\omega/c)(r_i + |p_l - r_i|)}$$

$U_{l,i}$ is an element of the propagation matrix;
l is the propagation matrix row index;
i is the propagation matrix column index;
$\omega$ is the angular frequency of the transmitted sound signal
$Q(\omega)$ is the Fourier Transform of the transmitted sound signal
$r_i$ is the distance from an origin (e.g. the transmitter 11) to the scattering array element whose properties are being determined
$p_l$ is the location of the receive element in the sonar receiver array.

That is, the propagation matrix elements comprise the Fourier transform of the outgoing sound pulse, and the Fourier transform of the delay incurred by its travel to and from the reflector (in the range cell being sensed). The delay caused by the multiplexing process can, therefore, be taken into account within this equation by adjusting the distance $|p_l - r_i|$ to compensate for the delay (which will appear as an increased distance between the scattering array element and the receive element).

It will be appreciated that the pseudoinverse $(UU^H)^+$ does not need to be calculated as the product of U and $U^H$ is a Hermitian matrix. Therefore, the inverse of $UU^H$ can be taken to be the diagonal eigenvalue matrix of $UU^H$, where each eigenvalue has been inverted.

The multiplexing and the introduced delay also has the effect of decreasing the grating lobe performance—the receivers in the receive array 12 appear further apart and the grating lobes, therefore, are closer together. However, if the multiplexing is designed carefully—e.g. in accordance with the technique described above—then the effect is limited to the rows of receivers. To compensate, therefore, the rows of receivers may be positioned closer together in the receive array 12.

To avoid spatial aliasing, the sample rate may be greater than twice the desired bandwidth of the signal for a given range resolution. Using the example figures given above, the signal bandwidth has been restricted to 37.5 kHz to achieve the desired range resolution, so the Nyquist sampling rate to avoid spatial aliasing would be 75 kHz.

As will be understood, some embodiments of the present invention may allow a sampling frequency to be used which is substantially equal to or greater than the required bandwidth of the analogue signals (for the desired range resolution) but which is less than twice the carrier frequency (i.e. the operating frequency) of the sonar system 1. In some embodiments, the sampling frequency may be equal to or greater than twice the operating frequency of the sonar system 1.

As will be appreciated the degree of multiplexing which is possible will depend on the desired range resolution—a greater range resolution will mean more bandwidth is required and the degree of multiplexing must be lower, for a given maximum sampling rate.

In some embodiments, the above described I/Q demodulator 1412 may be a FIR Hilbert Transform filter—configured to demodulate the digital channel data into digital output signals which include both complex and real parts. The FIR Hilbert Transform filter (compared to the conventional I/Q demodulator) would allow further reductions in the sampling frequency. This is because both the in-phase and quadrature components can be determined, using the FIR Hilbert Transform filter, from a single set of samples—it is not necessary to obtain a first set to determine the in-phase component and a second set to determine the quadrature component. In embodiments using the FIR Hilbert Transform filter, multiplications by cosine and sine that are part of conventional I/Q demodulation may be avoided.

In accordance with embodiments, elements for the channel circuitry 14 may be provided as on a printed circuit board 21 on which the receiver array 12 is mounted. These elements may include, for example, the pre-amplifiers 141$a$, and the switches 141$b$.

The analogue-to-digital converter 141 may be provided on a separate printed circuit board 22 and the beamforming circuitry 13 may also be provided on a separate printed circuit board 23. The circuit boards 21,22,23 may be arranged in a sandwich formation, with the circuit board 22 carrying the analogue-to-digital converter 141 mounted between the circuit board 21 carrying the receiver array 12 and the circuit board 23 carrying the beamforming circuitry 13. This provides a very compact construction. These circuit boards 21,22,23 may then be placed in a single housing 30.

Such housings 30 are conventionally filled with a liquid (such as Fluorinert® to provide desirable heat transfer characteristics between the housed components and the housing 30—to allow heat to be dissipated quickly. Because of the reduced power requirements of embodiments, liquids may be used for this purpose which have lower heat transfer performance—such as vegetable oils or hydraulic fluid.

In some embodiments, the housing 30 may be generally cylindrical. In some embodiments, a height of the housing 30 may be less than about 30 cm (e.g. about 20 cm) and the housing 30 may have a diameter of less than about 30 cm (e.g. about 20 cm). In some embodiments, the housing is formed of aluminium. In some embodiments, the receive 11 and/or transmit 12 arrays (or combined array) may be coated in a urethane layer.

According to some embodiments of the invention, a method of retrofitting aspects of the invention to an existing sonar system 1 is provided. The method may include the replacement of printed circuit boards of the existing sonar system 1 (or other circuitry) with printed circuit boards 21,22,23 (or other circuitry) according to embodiments of the invention. For example, the channel circuitry of an existing sonar system 1 may be replaced with the above described channel circuitry 14. The modified circuitry could then be housed in the housing 30 of the existing sonar system 1.

In some embodiments, the band pass filters 141$c$ may be replaced by respective low pass filters—which may provide sufficient filtering for some applications. The above description is to be read accordingly and relates equally to such embodiments.

As will be understood, in embodiments, the multiplexing (and therefore delaying) of the signals from the receive array 12 uses a generalisation that each part of the sound wave pulse is reflected exactly the same by any target element—changes in phase caused by a delay may be accommodated during I/Q demodulation.

In some embodiments, the transmitter circuitry 13 may be configured to drive the operation of the transmitter 11 or transmitters 11 to output a sequence of pulses or pings. Accordingly, the or each transmitter 11 may be configured to output a sequence of pulses or pings.

In some embodiments, the sequence of pulses or pings comprises groups of pulses or pings, with each group may include one or more pulses or pings. In some embodiments, at least one group includes at least one pulse or ping which is of a different length (i.e. duration). Accordingly, one group may be different to another group. The difference in groups allows the receive array circuitry 14 to distinguish one group from another group of pulses or pings which are received by the receive array 12.

In accordance with embodiments, therefore, the use of different groups of pulses or pings enables consecutive groups of pulses and pings to be output by the transmitter 11 or transmitters 11 (and/or driven by the transmitter circuitry 13) at a higher rate than would otherwise be possible because the receive array 12 and receive array circuitry 14 can distinguish one group from another group. This, in turn, allows a better range resolution to be achieved.

As such a first group of pulses or pings may comprise a first pulse or ping of half the length normally used for the desired range resolution (a short pulse or ping), followed by a gap of the same length, followed by a pulse or ping of the length normally required for the desired range resolution (a long pulse or ping). A second of the group of pulses or pings, may comprise a single pulse of the length required for the desired range resolution.

The receive array 12 may receive pulses or pings reflected from one or more objects. The receive array circuitry 14 may be further configured to analyse the received pulses or pings. If the first received group comprises two pulses or pings with a gap therebetween, then this is determined to be the first group of pulses or pings. The second received group may comprise a single pulse or ping which is determined to be the second group of pulses or pings. Receipt of the first group of pulses or pings will mean that the range resolution for the range determined by the time of flight (i.e. the time between transmission and reception) will be the range resolution associated with the first group of pulses or pings. Receipt of the second group of pulses or pings gives a time of flight at a higher range resolution than the first group.

If the time between the transmission of the first and second groups of pulses or pings is known (for example, equal to the length of time required for the pulse or ping to travel one metre in water), and only one of the groups is received (e.g. the second group), then this implies that the other group (e.g. the first group) has not been received. If the received group is the second group, then the range resolution may be better than would otherwise be the case even though the first group was not received.

The time (i.e. gap) between the initial short pulse or ping and the later long pulse or ping of the first group, along with the length of the short and long pulse may be varied to achieve different range resolutions for a given sample rate. In some embodiments, the first pulse or ping may be the long pulse or ping and the subsequent pulse or ping may be the short pulse or ping.

The receive array circuitry 14 may be configured to monitor the time between received pings or pulses, the duration of each received ping or pulse, and sequence of received pings or pulses.

The receive array circuitry 14 may be configured to distinguish one group of pulses or pings from another group of pulses or pings based on one or more of the time between received pings or pulses, the duration of each received pulse or ping, and the sequence of the received pulses or pings.

The use of multiple distinguishable groups of pulses or pings, therefore, may allow multiple pings or pulses to be travelling through the water at any one time and to be distinguished from each other by receive array circuitry 14.

If an object from which a group of pings or pulses are reflected is at a range such that a second or subsequent pulse or ping of the group is not detected (i.e. it is reflected but falls between samples), then this gives information about the range of the object. In particular, a sample from which a first pulse or ping of the group may be detected could be a sample of that pulse or ping at any point along the length of the pulse or ping. Whether or not the second or subsequent pulse or ping is detected may allow, in some embodiments, the point of detection along the length of the first pulse or ping to be determined or inferred with greater accuracy—thus giving more information about the range of the object. In other words, the use of a group of pulses or pings may allow not only the time of flight between transmission of a first pulse/ping and the receipt of the reflected first pulse/ping to be used to determine range of an object, but the subsequent pulse(s) or ping(s) may be used to make the measured time of flight to be more accurate (and hence also to refine the determined range)—by determining to a greater accuracy when the first pulse or ping of the group was, in fact, received.

As will be understood, the receive array circuitry 14 and the transmitter circuitry 13 may be configured to communicate such that the receive array circuitry 14 is provided with information identifying the groups of pings or pulses being transmitted—this information may include, for example, transmission times, pulse or ping duration, gap duration, and sequence information for the pulses or pings of each group.

In embodiments, there are more than two groups of pings or pulses. In some embodiments, the groups of pings or pulses are selected substantially at random. In embodiments, the groups of pings or pulses are not predefined—in such embodiments, one or more of the duration of each ping or pulse, the duration of the gap between each ping or pulse, and the sequence of pings or pulses, is varied from group to group by the transmitter circuitry 13.

The use of different groups of pulses or pings may allow for compensation from distortion or interference—i.e. a particular group may suffer from distortion to a greater extent on reflection from a particular object than another group (e.g. because of the form of the object).

In accordance with some embodiments, a 3D instantaneous sonar system 1 is provided. Many conventional sonar systems are advertised as '3D'; however, many such conventional sonar systems are, in fact, 2D sonar systems which use sophisticated post-processing software to create 3D scene representations. This may be conventionally achieved by, for example, combining successive 2D scans—usually beams that are very narrow in the along-track direction, but wide in the across-track direction. The collection of 2D scan data sets can be combined by means of conventional post-processing to give a 3D data set. If the conventional sonar system were mounted on a vessel that moved at a constant speed without pitch, roll or heading variations, this would be reasonably easy. But in practice, all such sonar system are commonly mounted on vessels whose speed and motion varies constantly, due to pitch, roll, and heading changes, and vessel heave. This means that the processing to combine the successive data sets from sonar pulses must take into account precise vessel rotation and position measurement.

Over time, an relatively accurate 3D image may be produced according to such conventional techniques. However, frequently obtaining precise and good quality 3D images limits vessel speed to about 4 knots or less (about 2 m/s).

In some conventional sonar systems obtaining useful 3D images of a 100 m length of seabed at a depth of 125 m, takes around 50 seconds. The speed of sound in water is about 1500 m/s, so two-way travel for each ping or pulse will take about 250/1500 s, so during that 50 s period about (50*1500/250=) 300 pings or pulses will have been transmitted, received and processed to correct for vessel movement and motion.

Some embodiments of the present invention may provide an instantaneous 3D sonar system 1 which may cover a 50°×50° area with each ping or pulse. Therefore, for a 125 m depth, there would be a footprint of 100 m×100 m. Accordingly, in some embodiments, to cover 100 m×100 m of seafloor, one ping or pulse is all that would be required.

Therefore, in some embodiments, far fewer pings or pulses would be used over a given period (e.g. to obtain an accurate bathymetry dataset).

Some embodiments of the present invention may provide an instantaneous 3D sonar system 1, therefore, because for each data set from a single ping or pulse, all of the relative positions and angles of sonar targets are substantially correct, because the sonar system 1 (and, therefore, the vessel) has not moved significantly during the receipt of the ping or pulse. So, the data obtained per ping or pulse (i.e. per instant) provides a 3D image and this may not require any or any substantial post-processing. The term "instantaneous" when used in relation to the present invention is, therefore, to be considered accordingly and is distinct from the erroneous use of the term in the art in relation to other sonar systems.

Therefore, some embodiments, may provide images of an area of interest substantially instantly, rather than taking several minutes, or hours, to obtain and then longer to process. This may be an advantage in situations which are dynamic—e.g. inspecting the underside of a moving vessel, or the quick inspection of a harbour wall from a vessel moving at 10 or 15 knots.

Some embodiments of the invention may be configured to provide images from ahead of the current vessel position (unlike may conventional sonar systems which look straight down and survey the path taken by the vessel).

In some embodiments, approximately half the image data is from in front of the vessel, and around half from behind the vessel. This may be advantageous in monitoring the movement of a target of interest—such as divers, porpoises, or autonomous underwater vehicles.

In addition, in some embodiments, any change that takes place within the volume covered by the pings or pulses, over several pings/pulses will be more obvious to the user in real time.

In some embodiments, use of a sonar system 1 as described herein, may reduce the requirement for complex equipment to be provided to determine the movement of the vessel during operation. In addition, the user may not require such a high skill or training level compared to operation of conventional sonar systems (because of the instantaneous operation of some embodiments).

Embodiments of the present invention have been described with reference to a sonar system 1. However, it will be appreciated that these embodiments may also be applied to other acoustic imaging systems including, for example, ultrasound imaging systems.

The vessel as described above would, in the case of an ultrasound imaging system, be the carrier of the ultrasound imaging system—which may be a wand or other handheld device, or which could take a number of different forms. The carrier of such embodiments, may carry the receive and transmit arrays 11,12 and may be coupled to a base unit (through a wired or wireless connection) which may include one or more other components of the acoustic imaging system.

Embodiments comprising a different acoustic imaging system (other than a sonar system) may include, for example, an ultrasound imaging system using an operating frequency in the ultrasonic range (e.g. around 20 kHz and above). The operating frequency may be as high as around 20 MHz in some embodiments and may be between around 1 MHz and around 18 or 20 MHz. The ultrasound imaging system may be a medical ultrasound system.

In the above description, therefore, references to sonar should be viewed as being equally applicable to ultrasound.

As will be appreciated, some embodiments of the present invention relate to sonar systems, and/or to acoustic imaging systems including sonar systems, ultrasound imaging systems, and other acoustic imaging systems, and/or acoustic imaging systems not including sonar systems.

As used herein, for the avoidance of doubt, the term "bandwidth" is a reference to the difference between the maximum and minimum frequencies between which information is required to be acquired or transmitted—in other words, the "passband bandwidth".

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. Receive array circuitry for a sonar imaging system, the receive array circuitry comprising:
    a plurality of inputs, each input being configured to receive an analogue signal from a receiver of a substantially planar sonar receive array, wherein the analogue signals are representative of an acoustic pulse received by the substantially planar sonar receive array;
    an analogue-to-digital converter configured to sample and convert the analogue signals from the plurality of inputs into corresponding digital signals, wherein the analogue-to-digital converter is configured to sample each analogue signal at a sample rate which is determined based on a predetermined required bandwidth of that analogue signal, wherein the predetermined required bandwidth of that analogue signal is selected based on the required range resolution for the sonar imaging system, wherein the required bandwidth is less than a total bandwidth of that analogue signal, and wherein the sample rate is less than the Nyquist sample rate determined based on an operating frequency of the analogue signal;
    beamforming circuitry configured to receive the digital signals from the analogue to digital converter and to generate an acoustic image from the digital signals; and multiplexing circuitry configured to sequence the delivery of a plurality of the analogue signals to the analogue-to-digital converter in accordance with a multiplexing scheme and wherein the beamforming circuitry is configured to compensate for relative delays between samples captured by the analogue-to-digital converter, wherein the receive array circuitry is configured to output a 3D acoustic image using the digital signals corresponding with the analogue signals received in a single data set by the plurality of inputs from the substantially planar sonar receive array, the analogue signals relating to the same acoustic pulse.

2. Receive array circuitry according to claim 1, wherein the analogue-to-digital converter is further configured to receive a user selected range resolution.

3. Receive array circuitry according to claim 1, wherein the sample rate is a fraction of the operating frequency of the sonar imaging system.

4. Receive array circuitry according to claim 1, further comprising an I/Q demodulator configured to receive the digital signals from the analogue to digital converter, to perform I/Q demodulation, and to pass the I/Q demodulated digital signals to the beamforming circuitry.

5. Receive array circuitry according to claim 4, wherein the I/O demodulator uses an FIR Hilbert Transform filter.

6. Receive array circuitry according to claim 1, wherein the beamforming circuitry is configured to use a spectral decomposition of the aperture field technique to generate the acoustic image.

7. A sonar imaging system comprising:
   transmitter circuitry configured to drive the operation of a transmit array to output an acoustic pulse at an operating frequency; and
   receive array circuitry comprising:
      a plurality of inputs, each input being configured to receive an analogue signal from a receiver of a substantially planar sonar receive array;
      an analogue-to-digital converter configured to sample and convert the analogue signals from the plurality of inputs into corresponding digital signals,
   wherein the analogue-to-digital converter is configured to sample each analogue signal at a sample rate which is determined based on a predetermined required bandwidth of that analogue signal, wherein the predetermined required bandwidth of that analogue signal is selected based on the required range resolution for the sonar system, wherein the required bandwidth is less than a total bandwidth of that analogue signal, and wherein the sample rate is less than the Nyquist sample rate determined based on the operating frequency;
      beamforming circuitry configured to receive the digital signals from the analogue to digital converter and to generate an acoustic image from the digital signals; and
      multiplexing circuitry configured to sequence the delivery of a plurality of the analogue signals to the analogue-to-digital converter in accordance with a multiplexing scheme and wherein the beamforming circuitry is configured to compensate for relative delays between samples captured by the analogue-to-digital converter,
   wherein the receive array circuitry is configured to output a 3D acoustic image using the digital signals corresponding with the analogue signals received in a single data set by the plurality of inputs from the substantially planar sonar receive array, the analogue signals relating to the same acoustic pulse.

* * * * *